United States Patent [19]
Batra et al.

[11] Patent Number: 6,162,327
[45] Date of Patent: Dec. 19, 2000

[54] MULTIFUNCTIONAL TISSUE PAPER PRODUCT

[75] Inventors: Anjana Batra; David Louis DeAngelo; Arman Ebrahimpour, all of Cincinnati, Ohio

[73] Assignee: The Procter & Gamble Company, Cincinnati, Ohio

[21] Appl. No.: 09/398,551

[22] Filed: Sep. 17, 1999

[51] Int. Cl.⁷ .............................. D21H 17/06; D21H 11/00
[52] U.S. Cl. ...................... 162/109; 162/111; 162/166; 162/123; 162/117; 162/132; 428/153
[58] Field of Search .................................. 162/109, 111, 162/112–113, 116–117, 123–125, 126, 132, 164.1, 164.3, 164.6, 179, 168.2, 183, 166; 428/152–154

[56] References Cited

U.S. PATENT DOCUMENTS

| | | | |
|---|---|---|---|
| 4,191,609 | 3/1980 | Trokhan . | |
| 4,441,962 | 4/1984 | Osborn, III | 162/111 |
| 4,529,480 | 7/1985 | Trokhan et al. . | |
| 5,223,096 | 6/1993 | Phan et al. | 162/158 |
| 5,245,025 | 9/1993 | Trokhan et al. | 536/56 |
| 5,490,902 | 2/1996 | Schulz | 162/109 |
| 5,637,194 | 6/1997 | Ampulski et al. | 162/109 |
| 5,656,132 | 8/1997 | Farrington, Jr. et al. | 162/117 |

*Primary Examiner*—Stanley S. Silverman
*Assistant Examiner*—Jose A. Fortuna
*Attorney, Agent, or Firm*—Larry L. Huston; Donald E. Hasse; Steven W. Miller

[57] ABSTRACT

A multifunctional tissue paper product having a combination of good wet strength, flexibility and preferably absorbency. This combination allows the tissue paper to be strong enough for use as a paper towel, yet soft enough for use as a facial tissue.

15 Claims, No Drawings

MULTIFUNCTIONAL TISSUE PAPER PRODUCT

FIELD OF THE INVENTION

The present invention relates to tissue paper products, and more particularly to multifunctional tissue paper products having a combination of good wet strength, flexibility and absorbency.

BACKGROUND OF THE INVENTION

Tissue paper products such as facial tissues, toilet tissue, paper towels, and napkins, are well known in the art. These products are formulated to exhibit a wide range of properties in terms of absorbency, bulk, strength, and softness.

Various uses for tissue paper products are known in the art as set forth above. However, tissue paper products are not necessarily interchangeable. For example, a tissue paper product used for paper toweling is frequently too stiff and harsh for comfortable use as a facial tissue in blowing one's nose. Likewise, some paper toweling is too stiff for otherwise wiping one's face. Also, not all paper towels are soft enough to use for dusting of furniture.

Conversely, a facial tissue which is comfortable for blowing one's nose typically does not have the requisite strength to function well as a paper towel. Particularly, facial tissues as are known in the art typically do not have the requisite wet burst strength or may have excessive lint levels to properly function as a paper towel. Likewise, facial tissues typically do not have the requisite absorbency to function well as a paper towel. Neither product may have the caliper or basis weight necessary to function interchangeably with the other. Accordingly, there is a need in the art for a single product which can fulfill the dual functionality of providing paper toweling with softness sufficient to also function as a facial tissue.

Furthermore, in order to reduce the amount of fluids from passing through the tissue during use, consumers perform various compensating actions. For example, many consumers have been known to fold a tissue in half or select several tissues at once prior to use in order to enhance absorbency and strength as well as provide an improved barrier to prevent the fluids from wetting their hands. Such practices may be adequate in preventing hand wetting during use, however, they largely increase product consumption.

Accordingly, it would be desirable to provide a tissue paper product having sufficient wet strength, flexibility, absorption and softness that it would be useful for multiple tasks around the home.

SUMMARY OF THE INVENTION

Disclosed is a tissue paper product having a wet burst strength of from about 175 to about 800 grams (g) and a flexibility of from about 0.02 to about 0.14 gf*cm$^2$/cm.

DETAILED DESCRIPTION OF THE INVENTION

As used herein, the following terms have the following meanings:

Wet burst strength is a measure of a paper web's ability to absorb energy, when wet and subjected to deformation normal to the plane of the web.

Basis weight is the weight per unit area of a sample reported in lbs/3000 ft$^2$ (grams per square meter or g/m$^2$).

Caliper is the macroscopic thickness of a sample.

Apparent density is the basis weight of the sample divided by the caliper with appropriate unit conversions incorporated therein. Apparent density used herein has the units of grams/centimeters cubed (g/cm$^3$).

Machine direction, designated MD, is the direction parallel to the flow of the fiber structure through the product manufacturing equipment.

Cross machine direction, designated CD, is the direction perpendicular to the machine direction in the same plane of the tissue product.

Absorbency is the ability of a material to take up fluids by various means including capillary, osmotic, solvent or chemical action and retain such fluids.

Flexibility is a measure of deformation of the material without being broken and with or without returning of itself to its former shape.

A fiber is a slender object having a major axis which is relatively long compared to the two orthogonal axes and having an aspect ratio of at least 4/1, preferably at least 10/1.

The term "ply" means an individual web component optionally to be disposed in a substantially contiguous, face to face relationship with other plies, forming a multiple ply web of the present invention. It is also contemplated that a single web component can effectively form two "plies", for example, by being folded on itself.

Discussion

Tissue products herein may be prepared as a single sheet for use as a facial tissue, napkin, paper towel, or bath tissue, depending on the type of paper used for the cellulosic paper webs. A plurality of paper webs may also be provided on a roll having perforations to define individual web sections where each section is removable for use, such as is commonly used for bath tissue (e.g., toilet paper). If prepared as bath tissue, roll dispensing is the preferred method of use. However, in a preferred embodiment, a plurality of paper webs can be cut, folded, and optionally interleaved into a stack of tissues suitable for dispensing from a container, such as a box or tub.

Cellulosic Paper Webs

Cellulosic paper webs may be paper webs consisting essentially of cellulosic papermaking fibers. Optionally, the paper web may be foreshortened, and/or contain synthetic fibers. The paper webs can have a basis weight range where the low limit of the range can be about 10 g/m$^2$ per ply, about 13 g/m$^2$ per ply, or about 15 g/m$^2$ per ply. The high limit of the basis weight range can be about 100 g/r$^2$ per ply, about 40 g/m$^2$ per ply, or about 25 g/m$^2$ per ply. The cellulosic paper webs can be creped, uncreped, or wet microcontracted tissue webs suitable for use as facial tissue or paper towel. Generally, identical plies of the paper webs are used, that is plies, substantially identical in basis weight, thickness, composition and other properties. However, it is contemplated that certain benefits may be realized by using plies having differing properties. For example, the component plies may differ in basis weight, thickness, composition, or other properties, providing one side of the paper web with a relatively smooth surface, and one side with a relatively rougher surface.

Cellulosic paper webs of the present invention may be made by conventional processes known in the art for producing tissue paper useful for facial tissues, toilet tissue, paper towels, or napkins. However, cellulosic paper webs of the present invention can be made by through air drying processes by use of a patterned papermaking belt. A patterned resinous papermaking belt can comprise two primary components: a framework and a reinforcing structure. The framework can comprise a cured polymeric photosensitive resin.

One surface of the patterned resinous papermaking belt contacts one surface of the cellulosic paper webs carried thereon. During papermaking, this surface of the patterned resinous papermaking belt may imprint a pattern onto the surface of cellulosic paper webs corresponding to the pattern of the framework.

A patterned resinous papermaking belt suitable for making a preferred embodiment of the present invention may be made according to any of commonly assigned U.S. Pat. No. 4,514,345, issued Apr. 30, 1985 to Johnson et al.; U.S. Pat. No. 4,528,239, issued Jul. 9, 1985 to Trokhan; U.S. Pat. No. 5,098,522, issued Mar. 24, 1992; U.S. Pat. No. 5,260,171, issued Nov. 9, 1993 to Smurkoski et al.; U.S. Pat. No. 5,275,700, issued Jan. 4, 1994 to Trokhan; U.S. Pat. No. 5,328,565, issued Jul. 12, 1994 to Rasch et al.; U.S. Pat. No. 5,334,289, issued Aug. 2, 1994 to Trokhan et al.; U.S. Pat. No. 5,431,786, issued Jul. 11, 1995 to Rasch et al.; U.S. Pat. No. 5,496,624, issued Mar. 5, 1996 to Stelljes, Jr. et al.; U.S. Pat. No. 5,500,277, issued Mar. 19, 1996 to Trokhan et al.; U.S. Pat. No. 5,514,523, issued May 7, 1996 to Trokhan et al.; U.S. Pat. No. 5,554,467, issued Sep. 10, 1996, to Trokhan et al.; U.S. Pat. No. 5,566,724, issued Oct. 22, 1996 to Trokhan et al.; U.S. Pat. No. 5,624,790, issued Apr. 29, 1997 to Trokhan et al.; and U.S. Pat. No. 5,628,876, issued May 13, 1997 to Ayers et al., the disclosures of which are incorporated herein by reference.

The tissue paper of the present invention can have two primary regions. The first region comprises an imprinted region which is imprinted against the framework of a patterned resinous papermaking belt. The imprinted region preferably comprises an essentially continuous network. The continuous network of the first region of the paper is made on the essentially continuous framework of the papermaking belt and will generally correspond thereto in geometry and be disposed very closely thereto in position during papermaking.

The second region of the paper comprises a plurality of domes dispersed throughout the imprinted network region. The domes generally correspond in geometry, and during papermaking in position, to the deflection conduits in the belt. The domes protrude outwardly from the essentially continuous network region of the paper, by conforming to the deflection conduits during the papermaking process, the fibers in the domes are deflected in the Z-direction between the paper facing surface of the framework and the paper facing surface of the reinforcing structure. Preferably the domes are discrete.

Without being bound by theory, it is believed the domes and essentially continuous network regions of the paper may have generally equivalent basis weights. By deflecting the domes into the deflection conduits, the density of the domes is decreased relative to the density of the essentially continuous network region. Moreover, the essentially continuous network region (or other pattern as may be selected) may later be imprinted as, for example, against a Yankee drying drum. Such imprinting increases the density of the essentially continuous network region relative to that of the domes. A single ply of the resulting paper may be later embossed as is well known in the art.

The paper according to the present invention may be made according to any of commonly assigned U.S. Pat. No. 4,529,480, issued Jul. 16, 1985 to Trokhan; U.S. Pat. No. 4,637,859, issued Jan. 20, 1987 to Trokhan; U.S. Pat. No. 5,364,504, issued Nov. 15, 1994 to Smurkoski et al.; and U.S. Pat. No. 5,529,664, issued Jun. 25, 1996 to Trokhan et al., U.S. Pat. No. 5,679,222 issued Oct. 21, 1997 to Rasch et al., and U.S. Pat. No. 5,714,041 issued Feb. 3, 1998 to Ayers et al., the disclosures of which are incorporated herein by reference.

The cellulosic paper webs according to the present invention may be made according to any of commonly assigned U.S. Pat. No. 4,529,480, issued Jul. 16, 1985 to Trokhan; U.S. Pat. No. 4,637,859, issued Jan. 20, 1987 to Trokhan; U.S. Pat. No. 5,364,504, issued Nov. 15, 1994 to Smurkoski et al.; and U.S. Pat. No. 5,529,664, issued Jun. 25, 1996 to Trokhan et al. The cellulosic paper webs may have certain lotions or emollients added, for example according to any of commonly assigned U.S. Pat. No. 4,481,243, issued Nov. 6, 1984 to Allen; and U.S. Pat. No. 4,513,051 issued Apr. 23, 1985 to Lavash. The disclosures of all the above-mentioned patents are hereby incorporated herein by reference.

If desired, the paper webs may be dried and made on a through-air drying belt not having a patterned framework. Such paper webs may have discrete, high density regions and an essentially continuous low density network. During or after drying, the cellulosic paper webs may be subjected to a differential vacuum to increase its caliper and desensify selected regions. Such paper, and the associated belt, may be made according to the following patents: U.S. Pat. No. 3,301,746, issued Jan. 31, 1967 to Sanford et al.; U.S. Pat. No. 3,905,863, issued Sep. 16, 1975 to Ayers; U.S. Pat. No. 3,974,025, issued Aug. 10, 1976 to Ayers; U.S. Pat. No. 4,191,609, issued Mar. 4, 1980 to Trokhan; U.S. Pat. No. 4,239,065, issued Dec. 16, 1980 to Trokhan; U.S. Pat. No. 5,366,785 issued Nov. 22, 1994 to Sawdai; and U.S. Pat. No. 5,520,778, issued May 28, 1996 to Sawdai, the disclosures of which are incorporated herein by reference.

In yet another embodiment, the reinforcing structure may be a felt, also referred to as a press felt as is used in conventional papermaking without through-air drying. The framework may be applied to the felt reinforcing structure as taught by commonly assigned U.S. Pat. No. 5,549,790, issued Aug. 27, 1996 to Phan; U.S. Pat. No. 5,556,509, issued Sep. 17, 1996 to Trokhan et al.; U.S. Pat. No. 5,580,423, issued Dec. 3, 1996 to Ampulski et al.; U.S. Pat. No. 5,609,725, issued Mar. 11, 1997 to Phan; U.S. Pat. No. 5,629,052 issued May 13, 1997 to Trokhan et al.; U.S. Pat. No. 5,637,194, issued Jun. 10, 1997 to Ampulski et al.; U.S. Pat. No. 5,674,663, issued Oct. 7, 1997 to McFarland et al.; U.S. Pat. No. 5,693,187 issued Dec. 2, 1997 to Ampulski et al.; U.S. Pat. No. 5,709,775 issued Jan. 20, 1998 to Trokhan et al.; U.S. Pat. No. 5,776,307 issued Jul. 7, 1998 to Ampulski et al.; U.S. Pat. No. 5,795,440 issued Aug. 18, 1998 to Ampulski et al.; U.S. Pat. No. 5,814,190 issued Sep. 29, 1998 to Phan; U.S. Pat. No. 5,817,377 issued Oct. 6, 1998 to Trokhan et al.; U.S. Pat. No. 5,846,379 issued Dec. 8, 1998 to Ampulski et al.; U.S. Pat. No. 5,855,739 issued Jan. 5, 1999 to Ampulski et al.; and U.S. Pat. No. 5,861,082 issued Jan. 19, 1999 to Ampulski et al.; U.S. Pat. No. 5,871,887 issued Feb. 16, 1999 to Trokhan, et al.; and U.S. Pat. No. 5,897,745 issued Apr. 27, 1999 to Ampulski, et al., the disclosures of which are incorporated herein by reference.

If desired, the tissue paper may have multiple basis weights. Preferably the multiple basis weight paper has two or more distinguishable regions: regions with a relatively high basis weight, and regions with a relatively low basis weight. Preferably the high basis weight regions comprise an essentially continuous network. The low basis weight regions may be discrete. If desired, the paper according to present invention may also comprise intermediate basis weight regions disposed within the low basis weight regions. Such paper may be made according to commonly assigned U.S. Pat. No. 5,245,025, issued Sep. 14, 1993 to Trokhan et al., the disclosure of which is incorporated herein by reference. If the paper has only two different basis weight regions, an essentially continuous high basis weight region, with discrete low basis weight regions disposed throughout the essentially continuous high basis weight region, such paper may be made according to commonly assigned U.S. Pat. No. 5,527,428 issued Jun. 18, 1996 to Trokhan et al.; U.S. Pat. No. 5,534,326 issued Jul. 9, 1996 to Trokhan et al.; U.S. Pat. No. 5,654,076, issued Aug. 5, 1997 to Trokhan et al., and U.S. Pat. No. 5,820,730, issued Oct. 13, 1998 to Phan et al., the disclosures of which are incorporated herein by reference.

One may further wish to density selected regions of multiple basis weight paper. Such paper will have both multiple density regions and multiple basis weight regions. Such paper may be made according to commonly assigned U.S. Pat. No. 5,277,761, issued Jan. 11, 1994 to Phan et al.; U.S. Pat. No. 5,443,691, issued Aug. 22, 1995 to Phan et al., and U.S. Pat. No. 5,804,036 issued Sep. 8, 1998 to Phan et al., the disclosures of which are incorporated herein by reference.

The wet end papermaking belt used to make the multiple basis weight paper may comprise a plurality of protuberances. The protuberances are upstanding from the plane of the papermaking belt and are preferably discrete. The protuberances obturate drainage through selected regions of the papermaking belt, producing low and high basis weight regions in the paper respectively. The papermaking belt for use with the present invention may be made according to commonly assigned U.S. Pat. No. 5,503,715, issued Apr. 2, 1996 to Trokhan et al.; U.S. Pat. No. 5,614,061, issued Mar. 25, 1997 to Phan et al.; U.S. Pat. No. 5,804,281 issued Sep. 8, 1998 to Phan et at., the disclosures of which are incorporated herein by reference.

If desired, in place of a belt having the patterned framework described above, a belt having a jacquard weave may be utilized. Such a belt may be utilized as a forming wire, drying fabric, imprinting fabric, transfer clothing etc. A jacquard weave is reported in the literature to be particularly useful where one does not wish to compress or imprint the paper in a nip, such as typically occurs upon transfer to a Yankee drying drum. Illustrative belts having a jacquard weave are found in U.S. Pat. No. 5,429,686 issued Jul. 4, 1995 to Chiu et al. and U.S. Pat. No. 5,672,248 issued Sep. 30, 1997 to Wendt et al.

Preferably, the paper web according to the present invention is blended. By being blended, it is meant that the paper web comprises a homogeneous mixture of papermaking fibers. The homogeneous mixture preferably comprises both softwood and hardwood fibers. The softwood fibers may be provided in a range from 50% to 70%, with the balance being hardwood fibers. The fibers may be refined using any commercially available process and may include recycled fibers.

Optionally, the paper according to the present invention may be layered. If the paper is layered, a multi-channel headbox may be utilized as is known in the art. Such a headbox may have two, three, or more channels. Each channel may be provided with a different cellulosic fibrous slurry. Optionally, the same slurry may be provided in two or more of the channels. However, one of ordinary skill will recognize that if all channels contain the same furnish a blended paper will result.

Typically, the paper is layered so that shorter hardwood fibers are on the outside to provide a soft tactile sensation to the user. Longer softwood fibers are on the inside for strength. Thus, a three-channel headbox may produce a single-ply product, having two outer plies comprising predominantly hardwood fibers and a central ply comprising predominantly softwood fibers.

Alternatively, a two-channel headbox may produce a paper having one ply of predominantly softwood fibers and one ply of predominantly hardwood fibers. Such a paper may be joined to another ply of a like paper, so that the softwood layers of the resulting two-ply laminate are inwardly oriented toward each other and the hardwood layers are outwardly facing.

In an alternative manufacturing technique, multiple headboxes may be utilized in place of a single headbox having multiple channels. In the multiple headbox arrangement, the first headbox deposits a discrete layer of cellulosic fibers onto the forming wire. The second headbox deposits a second layer of cellulosic fibers onto the first. While, of course, some intermingling between the layers occurs, a predominantly layered paper results.

Layered paper of constant basis weight may be made according to the teachings of commonly assigned U.S. Pat. No. 3,994,771, issued Nov. 30, 1976 to Morgan, Jr. et al.; U.S. Pat. No. 4,225,382, issued Sep. 30, 1980 to Kearney et al.; and U.S. Pat. No. 4,300,981, issued Nov. 17, 1981 to Carstens, the disclosures of which are incorporated herein by reference.

If desired, the tissue web according to the present invention may be softened using chemical debonding techniques as are known in the art. Suitable debonders include quaternary and tertiary amine compounds as are known in the art. Additionally, silicone softeners may be used. If silicone softeners are selected, the silicone may be applied according to the teachings of commonly assigned U.S. Pat. No. 5,059,282 issued Oct. 22, 1991 to Ampulski, et al. and U.S. Pat. No. 5,389,204 issued Feb. 4, 1995 to Ampulski incorporated herein by reference. Suitable chemical debonders may be incorporated according to the teachings of commonly assigned U.S. Pat. No. 5,240,562 issued Aug. 31, 1993 to Phan, et al. and U.S. Pat. No. 5,223,096 issued Jun. 29, 1993 to Phan, et al. incorporated herein by reference.

If desired, the chemical softeners may be applied to the surface rather than at the wet end of the papermaking machine. If the chemical softeners are applied to the surface they may either be applied during the papermaking operation or during converting. Suitable processes for applying the chemical softeners to the surface of the paper after it is formed into an integral web are disclosed in commonly assigned U.S. Pat. No. 5,814,188 issued Sep. 29, 1998 to Vinson, et al. If desired, the softening agent may be applied to the surface of the paper web as a dispersion comprising the softening active ingredient, a vehicle in which the softening active ingredient is dispersed, and an electrolyte dissolved in the vehicle, such that the electrolyte causes the viscosity of the composition to be less than viscosity of a dispersion in the vehicle alone. Optionally, the softening composition may contain a bilayer disrupter to fully reduce the viscosity of the softening composition. The vehicle may also serve as a carrier that contains a chemical additive and aids in delivery of the additive.

The cellulosic paper webs of the present invention may optionally be foreshortened, as known in the art. Foreshortening can be accomplished by creping the cellulosic paper webs from a rigid surface, and preferably from a cylinder. A Yankee drying drum is commonly used for this purpose. Creping is accomplished with a doctor blade as is well known in the art. Creping may be accomplished according to commonly assigned U.S. Pat. No. 4,919,756, issued Apr. 24, 1992 to Sawdai, the disclosure of which is incorporated herein by reference. Alternatively or additionally, foreshortening may be accomplished via wet microcontraction as taught in commonly assigned U.S. Pat. No. 4,440,597, issued Apr. 3, 1984 to Wells et al., the disclosure of which is incorporated herein by reference.

If desired, and importantly, to improve the flexibility of the paper, the paper web may be mechanically worked. Mechanically working the paper may assist in improving softness by imparting flexibility and/or smoothness to the paper.

For example, the paper web may be lightly calendered to impart surface smoothness and reduce CD variations. If the paper web is lightly calendered, the calendering should not impart significant density increases to the paper web, particularly if a through air-dried substrate is selected for the paper web.

If desired, individual plies or two or more plies forming a laminate of a paper web according to the present invention may be ring rolled as is known in the art. During ring rolling, the paper web is preferably run through both machine direction and cross machine direction ring rolling activation units. Ring rolling activation units are sets of rolls juxtaposed to form a nip therebetween. The rolls have interdigitating teeth running either perpendicular or parallel to the web path, depending upon whether or not activation is desired in the machine direction or cross machine direction, respectively. For the embodiments described herein, the rolls were about 8 inches (20.3 cm) in diameter. The machine direction activation unit had a tooth engagement of 0.012 inches (0.03 cm). The cross machine direction activation unit had a tooth engagement of 0.045 inches (0.114 cm). The ring rolling operation imparts flexibility and softness to individual plies or a laminate thereof. Individual ring rolled plies may later be combined by embossing and laminating.

Alternatively or additionally, the paper may be microcreped as is known in the art. During the microcreping process, the paper is simultaneously foreshortened via rush transfer and constrained in the Z direction. Microcreping may be accomplished using equipment available from the Bird Machine Company of South Walpole, Mass.

The paper web may comprise passively bonded fibers. Passively bonded hydrophilic fibers include cotton batting formed into a nonwoven web such that it can be stored as roll stock for use in the papermaking process. Alternatively, passively bonded hydrophilic fibers can comprise natural fibers such as cotton fibers or air blown pulp or synthetic fibers such as bicomponent fibers composed of polyethylene and polypropylene treated with a surfactant in order to provide hydrophilicity. Such natural or synthetic fibers can be introduced between the outer cellulosic plies via an air forming process. Synthetic fibers may be particularly useful for obtaining the upper limits of the wet burst ranges described herein.

In the air forming process, a first paper web is laid onto an air permeable forming wire. The forming wire and web pass through a vacuum section where dry cotton or pulp fibers are fed into a moving air system and vacuumed onto the first paper web. The forming wire, first paper web, and layer of dry fibers exit the vacuuming section and are covered by a second paper web.

The paper web may comprise actively bonded fibers. Actively bonded hydrophilic fibers can include wet laid cellulosic webs and nonwovens. Wet laid cellulosic webs providing a high caliper, low density, absorbent ply can be made by the through air drying process previously described using patterned resinous papermaking belts. The wet laid webs may comprise single or multiple lamina cellulosic structures. Each web may have three or more identifiable regions which may be distinguished from one another by intensive properties as taught in U.S. Pat. No 5,843,279 issued Phan et al. Dec. 1, 1998 which is incorporated herein by reference. The intensive properties that may be used to identify and distinguish different regions of the fibrous structure are basis weight, thickness, density and projected average pore size.

Multi-Ply Tissue Products

The plies of the tissue product of the present invention can be passively bonded or a certain amount of adhesive or other active bonding means could be added to provide additional adhesion to portions of the component plies. For example, needling, embossing, or other thermal or mechanical bonding means could be used to actively bond the paper web near some or all of the edges of paper web, thereby providing increased resistance to undesired delamination of the component plies.

Joining may also be by ultrasonic bonding or autogeneous bonding as disclosed in U.S. Pat. No. 4,919,738 issued Apr. 24, 1990 to Ball et al., or other bonding methods known in the art. For example, if the edges of the ply or layers are coextensive with the edges of the outer plies, adhesive bonding may not provide active bonding, depending on the adhesive used, and the surface energy characteristics of the ply. In this case, mechanical bonding may be more desirable, for example by mechanical bonding at a mechanical bonding station after formation of the multiple ply web.

If desired, multiple plies of the tissue product described and claimed herein may be joined and embossed. If desired, the plies may be joined together using knob-to-knob embossing as is known in the art and described in commonly assigned U.S. Pat. No. 3,414,459 issued Dec. 3, 1968 to Wells and illustrated by U.S. Pat. No. Des. 239,137 issued Mar. 9, 1976 Appleman, both incorporated herein by reference. Alternatively, the multiple plies may be embossed using nested embossing as is known in the art and disclosed in U.S. Pat. No. 3,940,529 issued Feb. 24, 1976 to Hepford and 4,325,773 issued Apr. 20, 1982 to Schulz, incorporated herein by reference. Preferably, if embossing is selected the embossing is performed via a dual ply lamination process as disclosed in commonly assigned U.S. Pat. Nos. 5,294,475 and 5,468,232 issued Nov. 21, 1995 both incorporated herein by reference.

Material Properties

Tissue products such as disposable towels, toilet tissue, facial tissue, napkins and wet wipes manifest various physical characteristics which include basis weight and apparent density, both of which have been previously defined. Basis weight and apparent density relate to bulkiness of the tissue product providing consumer confidence that hands will remain dry during use without having to perform compensating actions. For the present invention, the entire tissue product can have a basis weight ranging from about 18 lbs/3000 ft$^2$ (30 g/m$^2$) to about 80 lbs/3000 ft$^2$ (130 g/m$^2$). Preferably, the entire tissue product can have a basis weight ranging from 25 lbs/3000 ft$^2$ (29 g/m$^2$) to about 32 lbs/3000 ft$^2$ (36 g/m$^2$). More preferably, the tissue product can have a basis weight of about 30 lbs/3000 ft$^2$ (49 g/m$^2$). Moreover, the tissue product of the present invention can have an apparent density range having a low limit of about 0.04 g/cm$^3$ or about 0.06 g/cm$^3$. Likewise, the apparent density range can have a high limit of about 0.15 g/cm$^3$ or of about 0.08 g/cm$^3$.

Tissue products according to the present invention preferably have sufficient strength to perform their intended tasks. Preferably, the tissue products according to the present invention perform their task when wetted, so that spills may be wiped and cleaning of hard surfaces may be accomplished. For the inventions described herein, the products preferably have a wet burst strength ranging from a lower limit of 175 g and preferably 200 g, to an upper limit of 800 g, more preferably 600 g, and most preferably 400 g.

It is preferable that the paper web according to the present invention has a relatively smooth surface. The relatively smooth surface promotes a soft tactile impression to the user, as noted above. For the products described herein, at least one face, and preferably both faces of the product, have a surface smoothness ranging from a lower limit of about 700 to an upper limit of about 1000 and preferably to an upper limit of about 850.

Preferably the paper product according to the present invention distributes and releases only limited amounts of lint in use. If excessive amounts of lint are released from the product in use, it may remain on surfaces that are attempted to be cleaned, as well as on the face of the user. For the embodiments described herein, the lint preferably has a lower limit of about 0.5 to about 1. For the embodiments described herein, the lint preferably has an upper limit of not more than about 7, more preferably not more than about 5, and most preferably not more than about 3.

Preferably the product according to the present invention has an appropriate coefficient of friction. If the coefficient of friction is too high, the paper product will be unpleasant for use as a facial tissue. For the embodiments described herein, the slip/stick coefficient of friction preferably ranges from a lower limit of about 0.01 and more preferably from a lower limit of about 0.025 to an upper limit of about 0.05 and more preferably to an upper limit of about 0.030.

For the present invention, the tissue product may have a caliper ranging from a lower limit of about 0.008 inches (0.02 cm) or preferably about 0.013 inches (0.03 cm) to an upper limit of about 0.044 inches (0.011 cm) to preferably about 0.026 inches (0.07 cm).

Softness has been described as a physiologically perceived attribute which is generally measured by expert or non-expert panel evaluations. Perceived softness can be broken down into two components; bulk softness and surface softness. Surface softness has been related to surface texture and smoothness while bulk softness has been correlated to mechanical properties such as compressibility and resiliency and flexibility.

High softness requires flexibility. Flexibility is a function of the bending stiffness of the material. For the present invention, the flexibility of the tissue product was measured in the CD and the MD directions. The method used for measuring the flexibility is described below. For the present invention, the tissue product may have a particular CD bending stiffness and a particular MD bending stiffness. The CD bending stiffness and MD bending stiffness are added together as the square root of the sum of the squares of the two aforementioned component bending stiffnesses. The square root of the sum of the squares of the two component bending stiffnesses provides the flexibility of the product. Preferably, the products described and claimed herein have a flexibility ranging from a lower limit of about 0.02 and preferably about 0.03 gf*cm$^2$/cm to an upper limit of about 0.14 gf*cm$^2$/cm and preferably about 0.11 gf*cm$^2$/cm, provided there are no other compensating factors.

For the paper web described herein, the total laminate, considering all plies together, may have a flexibility ranging from a lower limit of about 0.02 and preferably from about 0.03 to an upper limit of about 0.14 and preferably about 0.11 gf*cm$^2$/cm. It is to be recognized, however, that the upper limit may be extended to about 0.16 gf*cm$^2$/cm, provided that appropriate compensation is made through the basis weight. If the flexibility is extended to an upper limit greater than 0.14 gf*cm$^2$/cm, preferably the basis weight is less than about 25 lbs/3000 ft$^2$ so that undue stiffness does not result.

Products such as disposable towels, toilet tissue, facial tissue, napkins, and wet wipes require a certain amount of absorbency. Absorbency includes both rate and capacity. Absorbent capacity is a measure of the amount of distilled water absorbed and retained by the structure. The method used for determining the absorbency of the tissue product is described below. For the present invention, the tissue product can have an absorbency range with a low limit of about 15 g(water)/g(paper); or about 19 g(water)/g(paper). The high limit of the absorbency range can be about 30 g(water)/g(paper), or about 25 g(water)/g(paper).

The absorbent rate component of absorbency is important to ensure that the rate of pick-up is adequate to ensure residual liquids are not left behind after wiping with the paper product of the present invention. If the absorbent rate is not fast enough, the paper product will not prove satisfactory in use for cleaning, etc. For the invention described herein, the tissue product may have an absorbent rate ranging from a lower limit of about 0.09 and preferably about 0.18 g/second to an upper limit ranging from about 0.60 to preferably about 0.35 g/second.

It has been unexpectedly found that the paper webs according to the present invention when, inter alia, using a blended furnish with a cationic polyamide resin added in the range of 10 to 30 and preferably 15 to 25 lbs./ton at the wet end, and a quaternary ammonium softener added in the range of 1 to 10, preferably 3 to 8, and more preferably 3 to 6 lbs./ton at the wet end, yields a paper web having a wet burst strength of at least 200 g and even 250 g. The paper product according to the present invention is surprisingly lint free. Kymene LX added in the amount of 24 lbs./ton and a 50/50 mixture of quaternary ammonium compounds, particularly dihydrogenated tallow dimethyl ammonium methyl sulfate (DTDMAMS) and polyethylene glycol (PEG-400) available from Union Carbide, added in the amount of 3 lbs./ton have been found suitable for this purpose. Kymene 557H may prophetically be added in place of Kymene LX if one wanted to increase the amount of total Kymene addition to the system. Kymene is available from the Hercules Chemical Company of Wilmington, Del.

Analytical Methods (a) Sample Conditioning And Preparation

Samples are placed in a temperature and relative humidity controlled location for at least two hours prior to testing. Temperature is maintained at 73° (23° C.)±2° F. (±1° C). Relative humidity is maintained at 50% ±2%. All testing is conducted under these conditions.

(b) Wet Burst Strength

The wet burst strength is measured using an electronic burst tester and the following test conditions. The burst tester is a Thwing-Albert Burst Tester Cat. No. 177 equipped with a 2000 g load cell. The burst tester is supplied by Thwing-Albert Instrument Company, Philadelphia, Pa. 19154, U.S.A.

Take eight paper tissues and stack them in four pairs of two tissues each. Using scissors, cut the samples so that they are approximately 228 mm in the machine direction and approximately 114 mm in the cross-direction, each two finished product units thick.

First age the samples for two hours by attaching the sample stack together with a small paper clip and "fan" the other end of the sample stack to separate stack by a clamp in a 107° C. (±3° C.) forced draft oven for 5 minutes (±10 seconds). After the heating period, remove the sample stack from the oven and cool for a minimum of three minutes before testing.

Take one sample strip, holding the sample by the narrow cross direction edges, dipping the center of the sample into a pan filled with about 25 mm of distilled water. Leave the sample in the water four (4.0±0.5) seconds. Remove and drain for three (3.0±0.5) seconds holding the sample so the water runs off in the cross direction. Proceed with the test immediately after the drain step. Place the wet sample on the lower ring of the sample holding device with the outer surface of the product facing up, so that the wet part of the sample completely covers the open surface of the sample holding ring. If wrinkles are present, discard the sample and repeat with a new sample. After the sample is properly in place on the lower ring, turn the switch that lowers the upper ring. The sample to be tested is now securely gripped in the sample holding unit. Start the burst test immediately at this point by pressing the start button. The plunger will begin to rise. At the point when the sample tears or ruptures, report the maximum reading. The plunger will automatically reverse and return to its original starting position. Repeat this procedure on three more samples for a total of four tests, i.e., four replicates. Report the results, as an average of the four replicates, to the nearest gram.

For the present invention, the wet burst strength ranges from a lower limit of about 175 and preferably 200 g to an upper limit of 800, more preferably 600, and most preferably 400 g.

(c) Basis Weight

One stack of 8 plies is made from the preconditioned samples. The stack of 8 plies is cut into a 4 inch by 4 inch square. A rule die from Acme Steel Rule Die Corp. (5 Stevens St. Waterbury Conn., 06714) is used to accomplish this cutting.

For the actual measurement of the weight of the sample, a top loading balance with a minimum resolution of 0.01 g is used. The stack of 8 plies is laid on the pan of the top loading balance. The balance is protected from air drafts and other disturbances using a draft shield. Weights are recorded when the readings on the balance become constant. Weights are measured in grams.

The weight reading is divided by the number of plies tested. The weight reading is also divided by the area of the sample which is normally 16 in$^2$, which is approximately equal to 0.0103 m$^2$.

The unit of measure for basis weight as used herein is grams/square meter. This is calculated using the 0.0103 m$^2$ area noted above.

For the embodiments described herein, the paper web preferably has a basis weight ranging from a lower limit of 18 and more preferably from 25 lbs/3000 ft$^2$ to an upper limit of 80 and more preferably 32 lbs/3000 ft$^2$.

(d) Caliper

The samples are cut to a size greater than the size of the foot used to measure the caliper. The foot to be used is a circle with an area of 3.14 in.

The sample is placed on a horizontal flat surface and confined between the flat surface and a load foot having a horizontal loading surface, where the load foot loading surface has a circular surface area of about 3.14 square inches and applies a confining pressure of about 15 g/cm$^2$ (0.21 psi) to the sample. The caliper is the resulting gap between the flat surface and the load foot loading surface. Such measurements can be obtained on a VIR Electronic Thickness Tester Model II available from Thwing-Albert, Philadelphia, Pa. The caliper measurement is repeated and recorded at least five times. The result is reported in millimeters.

The sum of the readings recorded from the caliper tests is divided by the number of readings recorded. The result is reported in millimeters (mm).

For the present invention, the tissue product may have a caliper ranging from a lower limit of from about 0.008 inches and preferably about 0.013 inches to an upper limit of about 0.044 inches and preferably about 0.026 inches.

(e)(1) Absorbent Capacity

The absorbent capacity is a measure of the ability of a paper structure, while supported horizontally, to hold liquid. The absorbent capacity is measured using the following procedure. A full size sheet, preferably at least 4 inches (10.2 cm) square, is horizontally supported in a tared filament lined basket and weighed to provide the weight of the dry sheet. The filaments are Stren brand monofilament fibers having a diameter of 0.012 inches (0.3 mm) and are spaced on a rectangular pitch of 1.75 inches (4.45 cm) in one direction and a pitch of 2 inches (5.1 cm) in the perpendicular direction. This rectangular pitch is overlaid with a bilateral diagonal array of filaments spaced on a pitch of 1.3 inches (3.3 cm). The filament lined basket has crossed filaments which serve to support the sheet horizontally. The crossed filaments permit unrestricted movement of water into and out of the paper sheet. The sheet supported in the basket is lowered into a distilled water bath having a temperature of 73±2° F. (23° C.) for one minute. The basket is then raised from the bath so that the sheet is allowed to drain for 1 minute. The basket and sheet are then re-weighed to obtain the weight of the water absorbed by the sheet. The absorbent capacity, in g(water)/g(paper), is calculated by dividing the weight of the water absorbed by the sheet by the weight of the dry sheet. The absorbent capacity is reported as an average of at least 8 measurements.

For the products described herein, the tissue product can have an absorbency ranging from a lower limit of about 15 and preferably about 19 g(water)/g(paper) to an upper limit of about 30 and preferably about 25 g(water)/g(paper).

(e)(2) Absorbent Rate

The absorbent rate is a measure of the rate at which a paper structure acquires liquid by wicking. The absorbent rate is measured using the following procedure. The sample sheet, which is cut into a circular shape having a 3-inch diameter is horizontally supported on a tared filament tray. The tared filament tray utilizes nylon monofilament fibers available from the Berkeley Corporation and having a diameter of 0.069 inches (1.75 mm). The filaments are spaced on a square pitch of 0.5 inches (1.3 cm). Additionally, two perpendicular center filaments are provided and spaced on a 0.25 inch pitch (0.6 cm). The weight of the dry sample is determined.

A vertical tube having a diameter of 0.313 inches (0.80 cm) and holding a column of distilled water is provided. The tube is supplied with water from a reservoir to provide a convex meniscus adjacent the lip of the tube. The water level in the tube is adjustable, such as by a pump, so that the meniscus can be raised to contact a sample sheet positioned above the lip of the tube.

The sample sheet supported in the filament tray is positioned above the vertical tube, such that the filament tray is about ⅛ inch (0.32 cm) above the lip of the tube. The water level in the tube is then varied so that the meniscus contacts the sample, after which the pressure used to raise the meniscus (about 2 psi) is reduced to zero. The weight of the sample sheet is monitored as water is taken up by the sample. Time zero is set at the instant when the sample first takes up water (first change in balance reading from dry weight). At time equals two seconds (two seconds after time zero), the contact between the meniscus and the sample sheet is broken by suction (about 2 psi) applied to the water in the tube, and the wetted sample weight is recorded. The wetted sample is weighed after breaking contact between the meniscus and the sample so as not to include surface tension in the weight measurement.

The absorbent rate is the weight of the wetted sample minus the sample dry weight, divided by 2 seconds. The absorbent capacity is reported as an average of at least four measurements.

The absorbent rate is important so that the paper web according to the present invention absorbs liquids fast enough to be useful for cleaning hard surfaces without leaving residual liquids. For the embodiments described herein, the paper web preferably has an absorbent rate of at least about 0.09 and preferably at least about 0.18 g/second. The embodiments according to the present invention may have an upper limit of the absorbent rate of about 0.60 g/second and preferably an upper limit of about 0.35 g/second.

(f) Flexibility

Equipment for Measuring Flexibility

Flexibility of the tissue product is measured using a Pure Bending Test to determine the bending stiffness using a KES-FB2 Pure Bending Tester. The Pure Bending Tester is an instrument in the KES-FB series of Kawabata's Evaluation System. The unit is designed to measure basic mechanical properties of fabrics, non-wovens, papers and other film-like materials, and is available from Kato Tekko Co. Ltd., Kyoto, Japan.

The bending property is one of the valuable methods for determining stiffness. The cantilever method has been used for measuring the properties in the past. The KES-FB2 tester is an instrument used for pure bending tests. Unlike the cantilever method, this instrument has a special feature whereby the whole tissue product sample is accurately bent in an arc of constant radius, and the angle of curvature is changed continuously.

Method for Measuring Flexibility

Tissue product samples are cut to approximately 15.2× 20.3 cm in the machine and cross machine directions, respectively. Each sample in turn is placed in the jaws of the KES-FB2 such that the sample would first be bent with the first surface undergoing tension and the second surface undergoing compression. In the orientation of the KES-FB2 the first surface is right facing and the second surface is left facing. The distance between the front moving jaw and the rear stationary jaw is 1 cm. The sample is secured in the instrument in the following manner.

First the front moving chuck and the rear stationary chuck are opened to accept the sample. The sample is inserted midway between the top and bottom of the jaws. The rear stationary chuck is then closed by uniformly tightening the upper and lower thumb screws until the sample is snug, but not overly tight. The jaws on the front stationary chuck are then closed in a similar fashion. The sample is adjusted for squareness in the chuck, then the front jaws are tightened to insure the sample is held securely. The distance (d) between the front chuck and the rear chuck is 1 cm.

The output of the instrument is load cell voltage (Vy) and curvature voltage 5 (Vx). The load cell voltage is converted to a bending moment (M) normalized for sample width in the following manner:

$$\text{Moment } (M, \text{gf*cm}^2/\text{cm}) = (Vy * Sy * d)/W$$

where Vy is the load cell voltage,
Sy is the instrument sensitivity in gf*cm/V,
d is the distance between the chucks,
and W is the sample width in centimeters.

The sensitivity switch of the instrument is set at 5×1. Using this setting the instrument is calibrated using two 50 g weights. Each weight is suspended from a thread. The thread is wrapped around the bar on the bottom end of the rear stationary chuck and hooked to a pin extending from the front and back of the center of the shaft. One weight thread is wrapped around the front and hooked to the back pin. The other weight thread is wrapped around the back of the shaft and hooked to the front pin. Two pulleys are secured to the instrument on the right and left side. The top of the pulleys are horizontal to the center pin. Both weights are then hung over the pulleys (one on the left and one on the right) at the same time. The full scale voltage is set at 10 V. The radius of the center shaft is 0.5 cm. Thus the resultant full scale sensitivity (Sy) for the Moment axis is 100 gf*0.5 cm/10V (5 gf*cm/V).

The output for the Curvature axis is calibrated by starting the measurement motor and manually stopping the moving chuck when the indicator dial reached 1.0 cm−1. The output voltage (Vx) is adjusted to 0.5 volts. The resultant sensitivity (Sx) for the curvature axis is 2/(volts*cm). The curvature (K) is obtained in the following manner:

$$\text{Curvature } (K, \text{cm}-1) = Sx * Vx$$

where Sx is the sensitivity of the curvature axis
and Vx is the output voltage

For determination of the bending stiffness the moving chuck is cycled from a curvature of 0 cm$^{-1}$ to +1 cm$^{-1}$ to −1 cm$^{-1}$ to 0 cm$^{-1}$ at a rate of 0.5 cm$^{-1}$/sec. Each sample is cycled continuously until four complete cycles are obtained. The output voltage of the instrument is recorded in a digital format using a personal computer. A typical output for a bending stiffness test is shown in FIG. 4. At the start of the test there is no tension on the sample. As the test begins the load cell begins to experience a load as the sample is bent. The initial rotation is clockwise when viewed from the top down on the instrument.

In the forward bend the first surface of the fabric is described as being in tension and the second surface is being compressed. The load continued to increase until the bending curvature reached approximately +1 cm$^{-1}$ (this is the Forward Bend (FB). At approximately +1 cm$^{-1}$ the direction of rotation is reversed. During the return the load cell reading decreases. This is the Forward Bend Return (FR). As the rotating chuck passes 0 curvature begins in the opposite direction, that is the sheet side now compresses and the no-سheet side extends. The Backward Bend (BB) extended to approximately −1 cm$^{-1}$ at which the direction of rotation is reversed and the Backward Bend Return (BR) is obtained.

The data are analyzed in the following manner. A linear regression line is obtained between approximately 0.2 and 0.7 cm$^{-1}$ for the Forward Bend (FB) and the Forward Bend Return (FR). A linear regression line is obtained between approximately −0.2 and −0.7cm$^{-1}$ for the Backward Bend (BB) and the Backward Bend Return (BR). The slope of the line is the Bending Stiffness (B). It has units of gf*cm$^2$/cm.

This is obtained for each of the four cycles for each of the four segments. The slope of each line is reported as the Bending Stiffness (B). It has units of gf*cm$^2$/cm. The Bending Stiffness of the Forward Bend is noted as BFB. The individual segment values for the four cycles are averaged and reported as an average BFB, BFR, BBF, BBR. Two separate samples in the MD and the CD are run. Values for the two samples are averaged together using the square root of the sum of the squares.

(g) Surface Smoothness

The surface smoothness of a side of a paper web is measured based upon the method for measuring physiological surface smoothness (PSS) set forth in the 1991 International paper Physics Conference. TAPPI Book 1, article entitled "Methods for the Measurement of the Mechanical Properties of Tissue Paper" by Ampulski et al. found at page 19, which article is incorporated herein by reference. The PSS measurement as used herein is the point by point sum of amplitude values as described in the above article. The measurement procedures set forth in the article are also generally described in U.S. Pat. No. 5,059,282 issued to Ampulski et al., which patents are incorporated herein by reference.

For purposes of testing the paper samples of the present invention, the method for measuring PSS in the above article is used to measure surface smoothness, with the following procedural modifications:

Instead of importing digitized data pairs (amplitude and time) into SAS software for 10 samples, as described in the above article, the Surface Smoothness measurement is made by acquiring, digitizing, and statistically processing data for the 10 samples using LABVIEW brand software available from national Instruments of Austin, Tex. Each amplitude spectrum is generated using the "Amplitude and Phase Spectrum.vi" module in the LABVIEW software package, with "Amp Spectrum Mag Vrms" selected as the output spectrum. An output spectrum is obtained for each of the 10 samples.

Each output spectrum is then smoothed using the following weight factors in LABVIEW: 0.000246, 0.000485, 0.00756, 0.062997. These weight factors are selected to imitate the smoothing provided by the factors 0.0039, 0.0077, 0.120, 1.0 specified in the above article for the SAS program.

After smoothing, each spectrum is filtered using the frequency filters specified in the above article. The value of PSS, in microns, is then calculated, as described in the above mentioned article, for each individually filtered spectrum. The surface smoothness of the side of a paper web is the average of the 10 PSS values measured from the 10 samples taken from the same side of the paper web. Similarly, the surface smoothness of the opposite side of the paper web can be measured. If the surface smoothness of either external face of the tissue product according to the present invention falls within the limits specified herein, the entire product is deemed to fall within such limits.

For the products described herein, at least one face, and preferably both faces, of the product have a surface smoothness ranging from a lower limit of about 700 to an upper limit of about 1000 and preferably to an upper limit of about 850.

(h) Lint

Lint is measured in accordance with the procedure set forth in commonly assigned U.S. Pat. No. 5,814,188 issued Sep. 29, 1998 to Vinson et al., and incorporated herein by reference. For the embodiments described herein, the lint is preferably kept very low, although processing difficulties may result if the lint is to be kept particularly low. For the embodiments described herein, the lint preferably has a lower limit of 0.5 to 1. For the embodiments described herein, the lint preferably has an upper limit of not more than 7, more preferably not more than 5, and most preferably not more than 3.

(i) Slip/Stick Coefficient of Friction

Slip-and-stick coefficient of friction (S&S COF) is defined as the mean deviation of the coefficient of friction. Like the coefficient of friction, it is also dimensionless. This test is performed on a KES-4BF surface analyzer with a modified friction probe. The surface tester was obtained from KATO TECH CO., LTD., Karato-Cho, Nishikiyo, Minami-Ku, Koyota, Japan. The instrument consists of a surface probe attached to a force transducer which detects the horizontal force on the probe as the tissue is moved under the detection surface. The tissue moves at a constant rate of 1 mm/second. It is found that the standard KES friction surface probe, a series of metal wires, is not sensitive to detecting differences in tissue samples. The sensitivity is therefore increased by replacing the wires with a two centimeter diameter 40 to 60 micron glass frit. It is found that the microscopically rough surface is desirable, since it could interact with the tissue surface fibers much like a finger. The glass frit is found to be a workable compromise between obtaining a suitable signal and not tearing the tissue. The normal force of the probe is 12.5 grams. A typical friction tracing is shown in FIG. 2 for a conventional tissue sample.

In the analysis, as the sample is scanned, the instrument senses the lateral force on the probe and integrates the force, as the tissue moves under the probe. This force is called the frictional force. The ratio of the frictional force to the stylus weight is the coefficient of friction, u. The KES instrument also solves the following equation to determine the S&S COF for each scan of each sample.

$$S \& S\ COF = \frac{1}{X} \int_{x=0}^{x} (\bar{u} - u)\, dX$$

in which, u is the ratio of the frictional force to the probe loading $\bar{u}$ is the average value of u; and X is 20 mm.

The samples were scanned in both the forward and reverse direction. The average values from the forward and reverse scans of multiple samples were obtained and reported.

For the embodiments described herein, the slip/stick coefficient of friction preferably ranges from a lower limit of about 0.01 and more preferably from a lower limit of about 0.025 to an upper limit of about 0.05 and more preferably to an upper limit of about 0.030.

(j) Density

Density is the ratio of the basis weight to the caliper, both being measured as described above.

EXAMPLE I

Tissue paper sheets of the present invention are made according to the following process on a pilot scale Fourdrinier papermaking machine.

First, a 1% solution of a chemical softener is prepared according to the following procedure: 1. Equivalent molar concentrations of dihydrogenated tallow dimethyl ammonium methyl sulfate (DTDMAMS) and a polyhydroxy plasticizer, polyethylene glycol having a molecular weight of about 400 (PEG-400), is weighed; 2. The PEG is heated to about 150° F.; 3. The DTDMAMS is dissolved into the PEG to form a molten solution; 4. Shear stress is applied to form a homogeneous mixture of the DTDMAMS in PEG; 5. Dilution water is heated up to about 150° F.; 6. The molten mixture of DTDMAMS/PEG-400 is diluted to a 1% solution; and 7. Shear stress is applied to form an aqueous solution containing a vesicle suspension of the DTDMAMS/PEG400 mixture.

Second, a 3% by weight aqueous slurry of NSK is made in a conventional re-pulper. The NSK slurry is refined and a 2% solution of Kymene LX is added to the NSK stock pipe at a rate of 1.2% by weight of the dry fibers. The absorption of Kymene LX to NSK is enhanced via an in-line mixer. A 1% solution of carboxy methyl cellulose (CMC) is added after the in-line mixer at a rate of 0.325% by weight of the dry fibers to enhance the dry strength of the fibrous substrate. The absorption of CMC to NSK could optionally have been enhanced via an in-line mixer. Then, a 1% solution of the chemical softener mixture (DTDMAMS/PEG) is added to the NSK slurry at a rate of 0.15% by weight of the dry fibers. The absorption of the chemical softener mixture to NSK could optionally have been enhanced via an in-line mixer. The NSK slurry is diluted to 0.2% via the fan pump.

Third, a 3% by weight aqueous slurry of Eucalyptus is made in a conventional re-pulper. A 1% solution of the chemical softener is added to the EUC stock pipe at a rate of 0.15% by weight of the dry fibers. The absorption of the chemical softener mixture to EUC could optionally have been enhanced via an in-line mixer. The EUC slurry is diluted to 0.2% via the fan pump.

The treated furnish mixture (60% of NSK/40% of EUC) is blended in the head box and deposited onto a Fourdrinier wire to form an embryonic web. Dewatering occurs through the Fourdrinier wire and is assisted by a deflector and vacuum boxes. The Fourdrinier wire is of a 5-shed, satin weave configuration having 84 machine-direction and 76 cross-machine-direction monofilaments per inch, respectively. The embryonic wet web is transferred from the Fourdrinier wire, at a fiber consistency of about 22% at the point of transfer, to a photo-polymer fabric having 562 cells per square inch, 44 percent knuckle area and 12.3 mils of photo-polymer depth. Further de-watering is accomplishing by vacuum assisted drainage until the web has a fiber consistency of about 28%. The patterned web is pre-dried by air through drying. The web is then adhered to the surface of a Yankee dryer with a sprayed creping adhesive comprising of polyvinyl alcohol (PVA). The fiber consistency is increased to an estimated 99% before dry creping the web with a doctor blade. The dry web is formed into a roll at a speed of about 660 fpm (201 meters per minute). The dry web contains 0.075% by weight of DTDMAMS, 0.075% by weight of PEG-400, 0.5% by weight Kymene LX and 0.1% by weight CMC.

A softening formula comprising 40% esterified tallow based biodegradable quaternary amine softener available from Goldschmidt, 39% water, 190% polyethylene glycol PEG-400 available from Union Carbide, and 1% Neodol 91-8 surfactant available from Shell Chemical Company, and approximately 1% other process additives commonly used in papermaking. The softening formula is applied at a rate of 25 lbs/ton, via extrusion onto the wire side of each ply of the finished web.

Each ply was lightly calendered, then ring rolled using both machine direction and cross machine direction activation. The ring rolling units each included a pair of 8-inch rolls juxtaposed together to form a nip therebetween. The machine direction activation unit had an engagement of 0.012 inches (0.03 cm). The cross machine direction activation unit had an engagement of 0.045 inches (0.11 cm).

The two plies were then joined wire-side out into a unitary paper product by knob-to-knob embossing and laminated together using PVA adhesive on the embossing rolls. The resulting product is soft, flexible, absorbent and has high wet burst strength.

EXAMPLE II

Two paper webs are made according to the process described in Example 1. Each ply of the paper web then has the chemical softener applied by slot extrusion in the amount of 35 lbs./ton of finished product. Then contact cement adhesive was sprayed onto the inner surface of one ply. 3M spray mount artist adhesive (NJ Trade Secret Registry No. TSRN 04499600-6201P) was suitably used for this purpose. The plies are then joined together with light pressure. The resulting laminate was then ring rolled using the apparatus of Example I.

The resulting product was softer than that of Example I above. While the surface softness characteristics were about the same, the product of Example II exhibited greater flexibility. Also, the product of Example II was stronger but exhibited somewhat higher lint characteristics. The difference in flexibility between the products of Examples I and II are believed to be attributable to the differences in adhesive and the timing of the ring rolling operation.

Table 1 below provides the names of various commercially available paper towel, facial tissue and bath tissue products in Column A. Column A also provides products made according to the invention, particularly Examples I and II above in the last two rows, respectively. Column B provides the wet burst strength according to Method B above. Columns C through H provide the Basis Weight, Caliper, Absorbent Capacity, Absorbent Rate, Flexibility, Smoothness, Lint, and Slip/Stick Coefficient of Friction, all measured according to Analytical Test Methods C through H as described above.

The wet burst strength of typical bath tissue products is too low to measure. The flexibility of most tissue products is so low as to be typically less than 0.1 $gf*cm^2/cm$. The smoothness of most facial tissue products and bath tissue products is typically less than 1000.

While particular embodiments of the present invention have been illustrated and described, it would be obvious to those skilled in the art that various other changes and modifications can be made without departing from the spirit and scope of the invention. It is intended to cover in the appended claims all such changes and modifications that are within the scope of the invention.

TABLE 1

| Sample | Wet Burst (g) | Basis Weight (lbs/3000 ft$^2$) | Caliper (mils) | Absorbent Capacity g(water)/g(paper) | Absorbent Rate (g/sec) | Flexibility (gf*cm$^2$/cm) | Smoothness | Lint | Slip/Stick Coefficient of Friction |
|---|---|---|---|---|---|---|---|---|---|
| Bounty | 360 | 26.3 | 27.4 | 25.2 | 0.55 | 0.282 | 1148.50 | 0.6 | 0.048 |
| Bounty Rinse & Reuse | 514 | 32.5 | 31.5 | 25.4 | 0.68 | 0.377 | | | |
| Viva | 418 | 42.6 | 28.7 | 15.3 | 0.32 | 0.213 | 1218.5 | | 0.046 |
| Scott (embossed) | 210 | 26.0 | 32.4 | 12.8 | 0.12 | 0.347 | | | |
| Mardi Gras | 126 | 32.2 | 29.1 | 14.9 | 0.27 | 0.238 | | | |
| Hi Dri | 105 | 21.2 | 28.0 | 19.2 | 0.20 | 0.125 | | | |
| Brawny | 182 | 30.6 | 25.5 | 13.3 | 0.24 | 0.227 | | | |
| Sparkle | 193 | 28.3 | 22.6 | 14.5 | 0.40 | 0.218 | | | |

TABLE 1-continued

| Sample | Wet Burst (g) | Basis Weight (lbs/3000 ft$^2$) | Caliper (mils) | Absorbent Capacity g(water)/g(paper) | Absorbent Rate (g/sec) | Flexibility (gf*cm$^2$/cm) | Smoothness | Lint | Slip/Stick Coefficient of Friction |
|---|---|---|---|---|---|---|---|---|---|
| Viva Job Squad | 494 | 50.3 | 33.2 | 15.5 | 0.38 | | | | |
| Tempo | 194 | 37.3 | 24.4 | 11.17 | | 0.186 | 762.2 | | 0.018 |
| Charmin | 20 | 17.6 | 11.2 | 21.43 | | | | 8.3 | |
| Charmin Ultra | 35 | 24.5 | 17.6 | 25.72 | | | | 4.7 | |
| Charmin Plus | | 23.6 | 18.9 | 17.16 | | | | | |
| Northern | | 18.7 | 11.9 | 18.59 | | | | 1.3 | |
| Northern Ultra | | 26.2 | 17.9 | 18.86 | | | | 4.4 | |
| Kleenex Cottonelle Gentle Texture | | 16.3 | 16.8 | 23.43 | | 0.053 | 797.5 | 9.5 | 0.040 |
| Kleenex Cottonelle Now Softer | | 17.10 | 9.5 | 18.70 | | | | 9.4 | |
| Kleenex Cottonelle Ultra Soft | 13 | 23.3 | 13.8 | 16.46 | | | | 9.6 | |
| Soft 'N Gentle | | 19.0 | 11.0 | 24.53 | | | | 1.5 | |
| Angel Soft | | 19.0 | 9.7 | 18.80 | | | | 1.7 | |
| Scott | | 10.9 | 5.2 | 25.57 | | | | 0.6 | |
| Charmin Double Roll | 23 | 16.8 | 9.1 | 23.04 | | | | 8.9 | |
| Charmin Ultra Double Roll | 37 | 23.7 | 14.7 | 24.65 | | | | 4.7 | |
| Charmin Triple Roll | 23 | 15.0 | 6.2 | 23.23 | | | | 7.7 | |
| Northern Double Roll | | 18.5 | 7.5 | 17.54 | | | | 1.6 | |
| Northern Ultra Double Roll | | 26.2 | 13.6 | 17.78 | | | | 4.8 | |
| Kleenex Cottonelle Gentle Texture Double Roll | | 16.5 | 10.5 | 22.02 | | | | 10.6 | |
| Kleenex Cottonelle Now Softer Double Roll | | 17.0 | 8.8 | 19.30 | | | | 6.1 | |
| Kleenex Cottonelle Ultra Soft Double Roll | 10.5 | 23.2 | 14.0 | 16.72 | | | | 8.4 | |
| Angel Soft Double Roll | | 19.3 | 7.2 | 20.25 | | | | 1.3 | |
| Puffs Everyday | 50 | 18.3 | 16.6 | | 0.08 | | | 8.6 | |
| Puffs Plus | 107 | 24.0 | 23.1 | | | | | 6.2 | |
| New Puffs Plus | 127 | 28.1 | 27.1 | | | | | 10 | |
| Puffs Advanced Extra Strength | 145.1 | 25.3 | 26.4 | 20.88 | 0.287 | 0.059 | 735.4 | 10.04 | 0.21 |
| Kleenex | 40.3 | 17.6 | 15.2 | | | | | 2.9 | |
| Kleenex Cold Care Ultra Comfort | 67.9 | 25.4 | 20.6 | | | | | 2.3 | |
| Kleenex Cold Care With Lotion | 56.6 | 27.5 | 20.7 | | | | | 1.6 | |
| Kleenex Cold Care With Menthol | 62 | 25.9 | 24 | | | | | 4.1 | |
| Kleenex Cold Care Extra Large | 72 | 25.6 | 19.7 | | | | | 1.1 | |
| Scotties 2-Ply | 39.1 | 19.1 | 15.8 | | | | | 0.1 | |
| Scotties 3-Ply | 40.0 | 28.0 | 20.6 | | | | | 1.7 | |
| Invention Example 1 | 214 | 28.3 | 17.7 | 17.9 | 0.18 | 0.108 | 814.2 | 1.1 | 0.028 |
| Invention Example 2 | 254 | 26.9 | 15.9 | 19.1 | 0.09 | 0.072 | 817 | 6.8 | 0.027 |

What is claimed is:

1. Tissue paper having a wet burst strength of from about 175 to about 800 g and a flexibility of from about 0.02 to about 0.14 gf*cm$^2$/cm.

2. The tissue paper of claim 1 having a wet burst strength of from about 200 to about 600 g.

3. The tissue paper of claim 1 having a flexibility of from about 0.03 to about 0.11 gf*cm$^2$/cm.

4. The tissue paper according to claims 2 or 3 having an absorbent capacity of about 15 to about 30 g(water)/g (paper).

5. A tissue paper according to claim 4 having an absorbent capacity of about 19 to about 25 g.

6. A tissue paper according to claim 4 having a slip/stick coefficient of friction of about 0.010 to about 0.050.

7. A tissue paper according to claim 6 having a slip/stick coefficient of about 0.025 to about 0.030.

8. A tissue paper according to claim 6 having a lint rating ranging from 0.5 to about 7.

9. Tissue paper having a wet burst strength of from about 175 to about 800 g, and a flexibility of about 0.02 to about 0.16 gf*cm$^2$/cm, and a basis weight less than 25 lbs/3000 ft$^2$.

10. A tissue paper according to claim 9 having a lint ranging from about 0.5 to about 5.

11. Tissue paper according to claim 10 having an absorbent capacity ranging from about 15 to about 30 g(water)/g(paper).

12. Tissue paper according to claim 11 having an absorbent rate of about 0.09 to about 0.6 g/second.

13. A tissue paper according to claims 1 or 9 made from a blended furnish.

14. Tissue paper according to claim 13 containing cationic polyamide resin in the amount of 15 to 25 lbs. of resin per ton of tissue paper and amine softeners in the amount of 3 to 8 lbs. per ton of tissue paper.

15. A tissue paper according to claim 14 wherein said amine softeners are quaternary amine softeners.

* * * * *

UNITED STATES PATENT AND TRADEMARK OFFICE
CERTIFICATE OF CORRECTION

PATENT NO. : 6,162,327

DATED : December 19, 2000

INVENTOR(S) : Anjana Batra et al.

It is certified that error appears in the above-identified patent and that said Letters Patent is hereby corrected as shown below:

Column 17, line 43, "190%" should read -- 19%--.

Signed and Sealed this

Eighth Day of May, 2001

Attest:

NICHOLAS P. GODICI

Attesting Officer    Acting Director of the United States Patent and Trademark Office